(12) United States Patent
Ecke et al.

(10) Patent No.: US 10,601,278 B2
(45) Date of Patent: Mar. 24, 2020

(54) PROTECTION SYSTEM FOR AN ELECTRICAL MACHINE

(71) Applicant: Siemens Aktiengesellschaft, München (DE)

(72) Inventors: Christian-Jörg Ecke, Berlin (DE); René Thurley, Beelitz (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 540 days.

(21) Appl. No.: 15/324,497

(22) PCT Filed: Jun. 29, 2015

(86) PCT No.: PCT/EP2015/064667
§ 371 (c)(1),
(2) Date: Jan. 6, 2017

(87) PCT Pub. No.: WO2016/005217
PCT Pub. Date: Jan. 14, 2016

(65) Prior Publication Data
US 2017/0201142 A1    Jul. 13, 2017

(30) Foreign Application Priority Data

Jul. 8, 2014 (EP) ..................... 14176105

(51) Int. Cl.
*H02K 5/10* (2006.01)
*H02K 5/136* (2006.01)
(Continued)

(52) U.S. Cl.
CPC ............ *H02K 5/10* (2013.01); *H02K 5/136* (2013.01); *H02K 11/20* (2016.01); *H02K 7/1823* (2013.01); *H02K 2205/09* (2013.01)

(58) Field of Classification Search
CPC ...... H02K 5/12; H02K 5/136; H02K 2205/09; H02K 5/10; H02B 1/28; H02B 1/055;
(Continued)

(56) References Cited

U.S. PATENT DOCUMENTS 2,501,345 A * 3/1950 MacNeill ............. H02B 13/035
174/11 R
4,491,215 A * 1/1985 Meyer .................... B65G 21/00
198/735.4
(Continued)

FOREIGN PATENT DOCUMENTS

DE          3328784 A1    2/1985
DE     102010000804 A1    7/2011
(Continued)

OTHER PUBLICATIONS

English Machine Translation of EP 0482414 from Espacenet; Retrieved Apr. 30, 2019 (Year: 1991).*
(Continued)

*Primary Examiner* — Reinaldo Sanchez-Medina
*Assistant Examiner* — Nicole Gardner
(74) *Attorney, Agent, or Firm* — Henry M. Feiereisen LLC

(57) ABSTRACT

A protection system for an electrical machine includes a first connecting line for connecting an internal space of the electric machine to an external space surrounding the electrical machine, a valve, and a filter which is impermeable to dust. The valve and the first connecting line are configured to render the first connecting line impassable when the valve is closed, and to enable a first gaseous medium to enter the internal space from the external space when the valve is open. The filter is configured to filter the first gaseous medium that enters the internal space from the external space through the first connecting line.

20 Claims, 2 Drawing Sheets

(51) Int. Cl.
*H02K 11/20* (2016.01)
*H02K 7/18* (2006.01)

(58) Field of Classification Search
CPC ...... H02B 1/0356; H02B 1/046; H02B 1/045; Y10T 137/2569; Y10T 137/2514; Y10T 137/2572
See application file for complete search history.

(56) References Cited

U.S. PATENT DOCUMENTS

| | | | |
|---|---|---|---|
| 5,101,710 A * | 4/1992 | Baucom | ............... H02B 13/055 454/184 |
| 2010/0187025 A1 | 7/2010 | Kikuta | |
| 2012/0145075 A1 * | 6/2012 | Takahashi | ............ B25J 11/0075 118/323 |

FOREIGN PATENT DOCUMENTS

| | | |
|---|---|---|
| EP | 0482414 A1 | 4/1992 |
| EP | 1607250 A1 | 12/2005 |
| GB | 2292639 A | 2/1996 |
| RU | 122531 U1 | 11/2012 |
| WO | WO 03043163 A1 | 5/2003 |

OTHER PUBLICATIONS

Russian Search Report dated Oct. 2, 2017 with respect to counterpart Russian patent application 2016143069/07(068933).
Translation of Russian Search Report dated Oct. 2, 2017 with respect to counterpart Russian patent application 2016143069/07(068933).

* cited by examiner

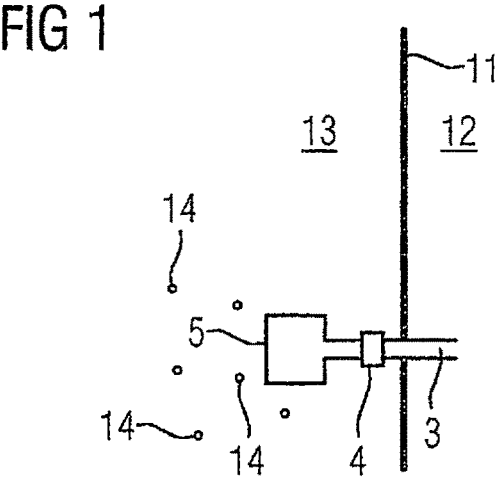
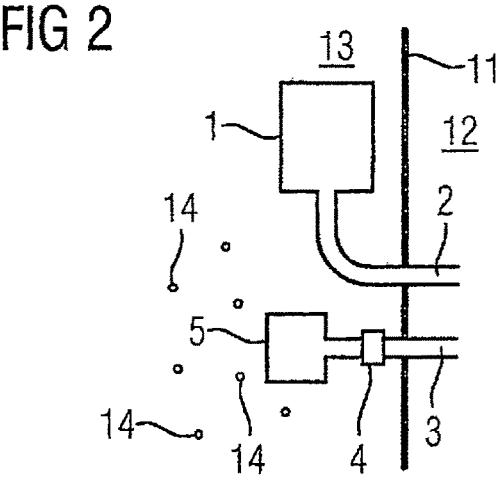
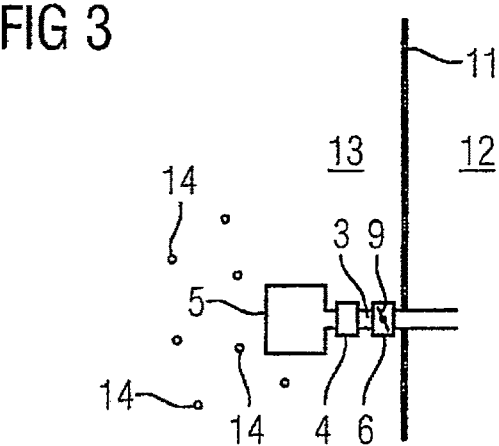

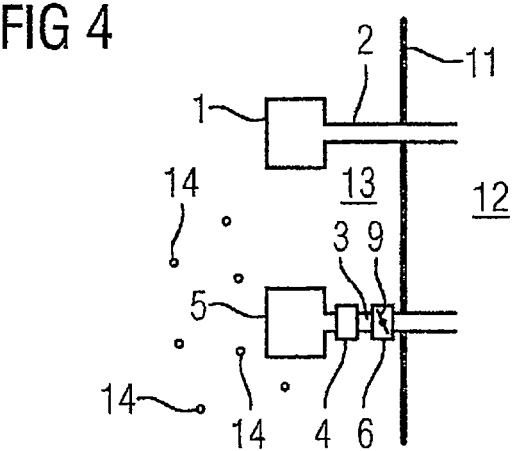
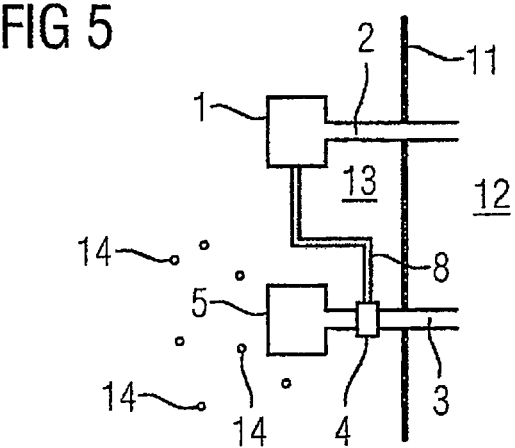
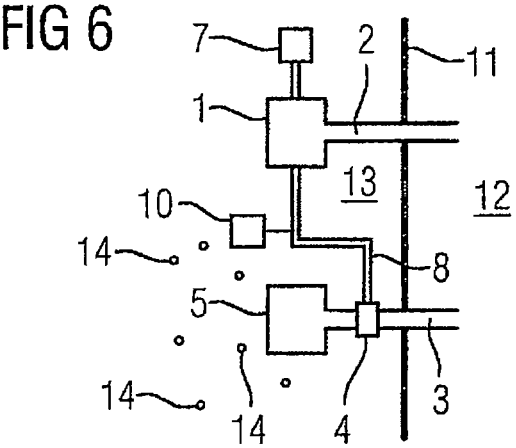

PROTECTION SYSTEM FOR AN ELECTRICAL MACHINE

CROSS-REFERENCES TO RELATED APPLICATIONS

This application is the U.S. National Stage of International Application No. PCT/EP2015/064667, filed Jun. 29, 2015, which designated the United States and has been published as International Publication No. WO 2016/005217 A1 which claims the priority of European Patent Application, Serial No. 14176105.6, filed Jul. 8, 2014, pursuant to 35 U.S.C. 119(a)-(d).

BACKGROUND OF THE INVENTION

The invention relates to a protection system for an electrical machine, wherein the electrical machine has a housing, which delimits an internal space in the electrical machine from an external space which surrounds the electrical machine.

Furthermore, the invention relates to an electrical machine, which has a housing, which delimits an internal space in the electrical machine from an external space which surrounds the electrical machine, and to a protection system of this type.

A protection system of this type or an electrical machine of this type can be used for instance in the environment of dusty or explosive media. If electric machines and in particular high-voltage electric machines are operated in the field of explosive media, an entry of flammable materials into the interior of the machines must be prevented.

If the machine is switched off after its operation, it still has residual heat, so that when the machine cools down, a vacuum develops in the interior of the machine. However, in the case of machines with multipart housings, it is not possible to achieve one hundred percent impermeability with a reasonable technical outlay. Accordingly, external air is drawn into the machine. Flammable dust can also enter the machine with this air. With dust-explosion-protected machines, dust is however not permitted in the machine because otherwise there is an explosion hazard. Therefore the machine previously had to be thoroughly cleaned before once again being started up.

SUMMARY OF THE INVENTION

The object underlying the invention is to provide a protection system or an electrical machine with an improved protection of the electrical machine, in particular an improved explosion protection.

This object is achieved by a protection system of the type cited in the introduction, such that the protection system has a first connecting line, by means of which the internal space can be connected to the external space, a valve and a filter, which is impermeable to dust, wherein the valve and the first connecting line are designed such that the first connecting line is impassable when the valve is closed, wherein the valve and the first connecting line are designed in such a way that a first gaseous medium can enter the internal space from the external space when the valve is open, wherein the filter is arranged in such a way that the first gaseous medium which enters the internal space from the external space through the first connecting line can be filtered.

Furthermore, this object is achieved by an electrical machine of the type cited in the introduction in that it has a protection system of this type.

During correct operation the internal space of the electrical machine generally has the same pressure as that which prevails in the external space. If the electrical machine is switched off or a malfunction occurs, which results in the electrical machine switching off, then a vacuum may develop in the internal space particularly while the electrical machine is cooling down. There is the risk that dust is sucked into the internal space particularly if the electrical machine is operated in a dusty environment, in particular in an environment in which explosive dust is present.

This undesirable situation is reliably avoided by the proposed protection system, by a controlled pressure equalization being enabled using the first connecting line, the valve and the filter, with which, thanks to the filter, an entry of dust into the internal space of the electrical machine is prevented. The pressure equalization between the vacuum in the internal space and the comparatively higher pressure in the external space is achieved in particular in that the first gaseous medium can flow from the external space through the filter and through the open valve via the first connecting line into the internal space. In this way the filter filters the first gaseous medium of dust or dust particles, so that only the first gaseous medium without dust particles can flow into the internal space. Unfiltered medium is reliably prevented from entering the internal space by means of this type of supply of the filtered first gaseous medium.

The filter is configured in particular such that dust particles from a certain particle size can be held back. Depending on the environment in which the electrical machine is operated, the particle size and thus the corresponding filter can be selected differently. In this way the filter is preferably to be selected such that permanent operation of the electrical machine in the selected environment is ensured despite the dust loading.

The proposed protection system thus allows for a pressure equalization, which does not involve the introduction of dust particles into the internal space of the electrical machine, so that the electrical machine can then be put into operation again without it being necessary to thoroughly remove dust from the internal space. As a result, the protection and in particular the explosion protection of the electrical machine can be designed in a manner which is more reliable, less complicated and thus simply better.

In addition, the protection system preferably has an external pressure sensor and an internal pressure sensor, by means of which the pressure currently present in the external space and, if applicable, internal pressure can be detected and the measured values of which can be taken into account in order to actuate or control the valve. Accordingly the valve is embodied to be controllable, wherein for control purposes a computing unit is used for instance, which is connected in a wireless or wired manner to the valve in order to transmit control commands. If the protection system has the computing unit explained above, the external pressure sensor is connected in a wireless or wired manner to the computing unit in order to transmit its sensor data.

In an advantageous embodiment of the invention, here the system has a pressure vessel for stockpiling a second gaseous medium, wherein the pressure vessel can be connected to the internal space using a second connecting line and wherein using the pressure vessel the internal space can be applied with an overpressure compared with an external pressure prevailing in the external space.

During correct operation, the internal space of the electrical machine is always applied with an overpressure compared with the external space with the aid of the pressure vessel. If a malfunction occurs however, which results in a drop in pressure in the internal space, a vacuum in the internal space can develop particularly while the electrical machine is cooling down. There is the risk that dust is sucked into the internal space particularly if the electrical machine is operated in a dusty environment, in particular in an environment in which explosive dust is present.

The pressure vessel can be used to further improve the explosion protection, by situations with a vacuum in the internal space occurring less frequently. If, however, a situation of this type occurs, a pressure equalization can be reached using the afore-mentioned filter, the first supply line and the valve, with which the explosion protection of the electrical machine is preserved.

In a further advantageous embodiment of the invention, the pressure vessel is embodied as a control box, wherein the protection system has an internal pressure sensor for detecting an internal pressure in the internal space, wherein the protection system has a switching unit for regulating the internal pressure in the internal space, wherein the internal pressure sensor is connected to the switching unit.

The switching unit thus has at least one terminal for the internal pressure sensor, which is connected in a wireless or wired manner to the switching unit. Here the switching unit is designed such that the internal pressure can be regulated, by the pressure vessel embodied as a control box having an outlet to the internal space. For instance provision can be made for a further valve, which is opened if the internal pressure falls below a predeterminable limit value, so that the internal space can be supplied with an additional, second, gaseous medium from the control box. Advantageously the valve can also be controlled using the control box, by means of which the first gaseous medium can enter the internal space from the external space.

In particular, an external pressure sensor is additionally provided, by means of which the external pressure in the external space can be detected and which is likewise connected to the switching unit. A supply line to feed pressurized air to the control box is preferably provided, wherein in particular the pressurized air supply explained further below can be used.

The control box is embodied as a pneumatic or electro-pneumatic control box for instance.

In a further advantageous embodiment of the invention, the protection system here has a pressurized air supply for the pressure vessel.

The second gaseous medium can be fed to the pressure vessel by means of the pressurized air supply, said gaseous medium always being free of dust, in particular flammable material. For instance, the pressurized air supply can be embodied as a compressor, which is provided with a corresponding filter, or as a terminal on a pressurized air system. In particular, thanks to the afore-mentioned first connecting line, the valve and the filter, a reliable explosion protection can then also be ensured if the pressurized air supply fails. This is the case, for instance, if the compressor is faulty or the pressurized air system has a leak.

In a further advantageous embodiment of the invention, the valve is actively connected to the pressure vessel such that the valve is opened if a pressure prevailing in the pressure vessel fails to reach a reference pressure, and the valve is closed if the pressure prevailing in the pressure vessel exceeds the reference pressure.

The active connection of the valve to the pressure vessel enables a reliable control of the valve which can be adjusted to the conditions. In particular, a fine adjustment can be performed which takes into account the special features of the electrical machine, such as, for instance, larger or smaller leaks in the housing of the electrical machine.

For instance, it may make sense to select the reference pressure to be only very marginally below the external pressure or to select the reference pressure to be even slightly above the external pressure, if the housing of the electrical machine has comparatively large leaks. With an electrical machine of this type, a comparatively low vacuum in the internal space would already quickly result in the first gaseous medium, in particular all the flammable dust disposed therein, entering the internal space unfiltered through the leaks. In particular, if the protection system has a retaining element, a reference pressure above the external pressure would advantageously not result in an overpressure prevailing in the internal space being output via the first connecting line to the external space. A retaining element of this type is explained by way of example further below.

The active connection is in particular the design that an opening of the valve is effected if the pressure prevailing in the pressure vessel drops below the reference pressure and, if applicable, does not reach the reference pressure, so that a pressure equalization is performed in particular with the presence of a vacuum in the internal space. Accordingly the active connection may be the design that a closure of the valve is effected if the pressure prevailing in the pressure vessel rises above the reference pressure or exceeds the reference pressure.

The active connection is preferably embodied such that a pressure sensor for measuring the pressure prevailing in the pressure vessel and a computing unit connected to the pressure sensor are provided, wherein the sensor data of the pressure sensor can be fed to the computing unit. The reference pressure can be stored in the computing unit so that the computing unit can output a corresponding control signal to the valve connected to the computing unit, in order to open or close the valve or to keep the valve open or closed. To this end the valve is also configured accordingly.

The valve is preferably actively connected to the pressure vessel such that the valve is closed if the pressure prevailing in the pressure vessel is equal to the reference pressure. In particular, the computing unit can be embodied as the afore-mentioned switching unit.

In a further advantageous embodiment of the invention, the reference pressure here is equal to the external pressure currently available.

In particular, the reference pressure is adjusted to a changing external pressure. Weather events, such as high pressure or low pressure areas, or the operation of the electrical machine on a modified sea level produce different external pressures for instance, which can deviate in particular from the standard pressure with standard conditions of 1013 hPa. A particularly reliable explosion protection is achieved in particular in that the protection system is configured to detect the external pressure currently available and, for instance, to take it into account when controlling the valve and if necessary the retaining element. Unforeseeable environmental influences can be reliably balanced out in this way.

For instance, for this purpose the proposed protection system has an external pressure sensor, by means of which the external pressure currently available can be detected. In particular, if the afore-mentioned computing unit is provided, the external pressure sensor is connected to the computing unit in order to transmit its sensor data, wherein the detected, external pressure currently available is stored in the computing unit as reference pressure.

In a further advantageous embodiment of the invention, the pressure vessel is connected to the valve using a control pressure line, wherein the valve is designed such that a pressure prevailing in the pressure vessel serves as a control pressure and the valve is opened if the control pressure is lower than the external pressure and the valve is closed if the control pressure is greater than the external pressure.

The control pressure line enables the pressure prevailing in the pressure vessel to be fed as control pressure to the valve, which opens as a function of the control pressure and the external pressure and, if applicable, is in an open position or closes and, if applicable, is in a closed position. To this end the valve is preferably embodied such that a comparison of the control pressure with the external pressure can be performed.

The connection mentioned between the pressure vessel and the valve with the aid of the control pressure line can, in particular, represent the afore-mentioned active connection of the valve to the pressure vessel.

In particular, the external pressure can be detected continuously, which offers advantages if the external pressure varies on account of weather influences and suchlike, as explained further above.

Advantageously the valve is designed here such that the valve is closed if the control pressure is equal to the external pressure.

In a further advantageous embodiment of the invention, the valve is embodied as a pneumatically controllable valve.

The valve can preferably be controlled or operated purely pneumatically and offers the advantage that it comparatively easily fulfills the requirements of an explosion-protected component. In particular, a valve of this type reliably separates a dust-loaded environment from an environment which has to be kept dust-free. Furthermore, such a valve has a high fail-safety. Advantageously the valve is embodied here as a spring-loaded, pneumatically controllable valve.

Preferably the pneumatically controllable valve is used in conjunction with the pressure vessel explained above, wherein the valve is advantageously actively connected to the pressure vessel. For instance, the pressure vessel can be embodied for this purpose as a control box, in particular pneumatic or electro-pneumatic control box. As explained above, a control pressure line can be used for this purpose for instance, wherein the afore-mentioned reference pressure or control pressure can also be used.

In a further advantageous embodiment of the invention, the filter is unpassable for flammable dust.

The configuration of the filter especially for the flammable dust and corresponding dust particles reliably prevents flammable dust from entering the internal space in the electrical machine. As a result, the explosion protection of the machine is significantly improved.

In a further advantageous embodiment of the invention, the protection system has a retaining element, which permits a volume flow through the first connecting line from the external space to the internal space and which prevents a volume flow through the first connecting line from the internal space to the external space.

The valve and the first connecting line in particular enable a volume flow from the external space to the internal space in the machine, provided the valve is open. As a result of the protection system, in particular the valve and/or the first connecting line, having the retaining element, a volume flow from the internal space to the external space can be reliably prevented. A volume flow of this type could appear in some instances with an otherwise open valve and without the retaining element in particular with an overpressure in the internal space of the electrical machine. The retaining element may be configured as a one-way flap or as an overpressure valve for instance, which is, in principle, passable exclusively for a volume flow from the external space into the internal space. The retaining element can in principle also be embodied as integrated into the valve.

In a further advantageous embodiment of the invention, in terms of flow the filter is arranged upstream of the valve in respect of the first gaseous medium entering the internal space from the external space.

An arrangement of the filter of this type prevents the valve from coming into contact with the flammable material, as a result of which a malfunction is prevented by blocking or jamming the valve, for instance. As a result, the availability and in particular the reliability of the proposed protection system are increased.

The filter is preferably arranged at any end of the first connecting line, which projects into the external space. This prevents flammable material from ever being able to enter the first connecting line.

In a further advantageous embodiment of the invention, the electrical machine can be operated with high voltage, with electrical power of at least 1 MW, in particular at least 5 MW, and/or in an explosion-protected manner.

An electrical voltage of at least 1 kV, in particular at least 5 kV, is considered to be a high voltage here.

The electrical machine can be embodied as a generator or motor for instance, in particular as a drive motor for a mill drive or suchlike. The proposed electrical machine is particularly suited here to operation in a dusty or explosive environment.

BRIEF DESCRIPTION OF THE DRAWINGS

The invention is described and explained in more detail below on the basis of the exemplary embodiment shown in the figures, in which:

FIGS. 1-6 show a first to sixth exemplary embodiment of the inventive protection system.

DETAILED DESCRIPTION OF THE EMBODIMENTS

FIG. 1 shows a first exemplary embodiment of the inventive protection system. The protection system is attached here to an electrical machine, which has a housing 11, which delimits an internal space 12 from an external space 13 in the electrical machine.

The protection system has a filter 5 which is impassable for dust particles 14, a valve 4 and a first connecting line 3, by means of which the internal space 12 can be connected to the external space 13. Here the valve 4 and the first connecting line 3 are embodied such that the first connecting line 3 is impassable when the valve 4 is closed and that a first gaseous medium can enter the internal space 12 from the external space 13 when the valve 4 is open. The filter 5 is arranged here such that the first gaseous medium that enters the internal space 12 from the external space 13 through the first connecting line 3 can be filtered.

In particular, the filter 5 is impermeable to flammable dust 14, so that the electrical machine is equipped with an improved explosion protection. Within the scope of the exemplary embodiment, here in terms of flow the filter 5 is arranged upstream of the valve 4 in respect of the first gaseous medium entering the internal space 12 from the external space 13.

In addition, the protection system preferably has an external pressure sensor, by means of which the pressure currently available in the external space 13 can be detected and the measured values of which can be taken into account in order to actuate or control the valve. If the protection system has the computing unit explained above, the external pressure sensor is connected to the computing unit in order to transmit its sensor data.

FIG. 2 shows a second exemplary embodiment of the inventive protection system. The same reference characters as in FIG. 1 refer here to the same subject matters.

Compared with the first exemplary embodiment, the protection system of the second exemplary embodiment additionally has a pressure vessel 1 for stockpiling a second gaseous medium, wherein the pressure vessel 1 is connected to the internal space 12 by means of a second connecting line 2. By means of the pressure vessel 1, the internal space 12 can be applied with an overpressure compared with an external pressure which prevails in the external space 13. In particular, the pressure vessel 1 can be embodied as a control box, which was mentioned further above.

The valve 4 is preferably actively connected to the pressure vessel 1 such that the valve 4 is opened if a pressure prevailing in the pressure vessel fails to reach a reference pressure, and the valve is closed if the pressure prevailing in the pressure vessel 1 exceeds the reference pressure. The active connection can be realized for instance using a pressure sensor for measuring the pressure prevailing in the pressure vessel 1 or in the internal space 12 and a computing unit, which is connected to the pressure sensor and to the valve for data transmission. The sensor data of the pressure sensor can thus be fed to the computing unit, wherein the computing unit can output a corresponding control signal to the connected valve 4.

Additionally the protection system preferably has an external pressure sensor, by means of which the pressure currently available in the external space 12 can be detected and the measured values of which can be taken into account during the active connection. If the protection system has the computing unit explained above, the external pressure sensor is connected to the computing unit in order to transmit its sensor data.

FIG. 3 or 4 shows a third or fourth exemplary embodiment of the inventive protection system.

Compared with the protection system of the first or second exemplary embodiment, the protection system of the third or fourth exemplary embodiment additionally has a retaining element 6, which is arranged in the first connecting line 3 between the valve 4 and the internal space 12. The retaining element 6 permits a volume flow through the first connecting line 3 from the external space 13 into the internal space 12 and prevents a volume flow from the internal space 12 to the external space 13. To this end the retaining element 6 has a type of drain check valve 9, for instance, as depicted in FIGS. 3 and 4.

FIG. 5 shows a fifth exemplary embodiment of the inventive system. Compared with the second exemplary embodiment, the protection system of the fifth exemplary embodiment additionally has a control pressure line 8, by means of which the pressure vessel 1 is connected to the valve 4. Here a pressure prevailing in the pressure vessel 1 serves as a control pressure of the valve 4. The valve 4 is preferably embodied such that the valve 4 is opened or closed if the control pressure is less than or greater than the external pressure. In particular, to this end the valve 4 is embodied to be pneumatically controllable.

For instance, the pressure vessel 1 is embodied as the afore-mentioned control box, wherein an internal pressure sensor for detecting an internal pressure in the internal space and a switching unit for regulating the internal pressure in the internal space can also be provided.

FIG. 6 shows a sixth exemplary embodiment of the inventive system. Compared with the fifth exemplary embodiment, the protection system of the sixth exemplary embodiment additionally has an external pressure sensor 10, by means of which the pressure currently available in the external space 13 On can be detected. If the protection system has the computing unit explained above, the external pressure sensor is connected to the computing unit in order to transmit its sensor data. In this case the computing unit can be configured as a switching unit for the control box embodied pressure vessel 1, wherein the switching unit is connected to an internal pressure sensor and the external pressure sensor 10.

Furthermore, the protection system has a pressurized air supply 7 for the pressure vessel 1, wherein the pressurized air supply 7 can be considered to be optional. Furthermore, a pressurized air supply 7 can be provided in the other exemplary embodiments.

In summary the invention relates to a protection system for an electrical machine, wherein the electrical machine has a housing, which delimits an internal space of the electrical machine from an external space which surrounds the electrical machine. Furthermore, the invention relates to an electrical machine, which has a housing, which delimits an internal space in the electrical machine from an external space which surrounds the electrical machine, and to a protection system of this type. In order to provide a protection system or an electrical machine with an improved protection of the electrical machine, in particular an improved explosion protection, it is proposed that the protection system has a first connecting line, by means of which the internal space can be connected to the external space, a valve and a filter, which is impermeable to dust, wherein the valve and the first connecting line are designed such that the first connecting line is impassable when the valve is closed, wherein the valve and the first connecting line are designed in such a way that a first gaseous medium can enter the internal space from the external space when the valve is open, wherein the filter is arranged in such a way that the first gaseous medium which enters the internal space from the external space through the first connecting line can be filtered.

The invention claimed is:

1. A protection system for an electrical machine, comprising:
   a first connecting line for connecting an internal space of the electric machine to an external space surrounding the electrical machine;
   a valve movable between a closed position in which the first connecting line is impassable, and an open position in which a flow of a first gaseous medium is permitted through the first connecting line so as to enter the internal space from the external space;
   a filter impermeable to dust, said filter configured to filter the first gaseous medium that enters the internal space from the external space through the first connecting line and to enable a pressure equalization in the event of a malfunction which causes a drop in pressure in the internal space;
   a pressure vessel for stockpiling a second gaseous medium, said pressure vessel being configured to subject the internal space to an overpressure compared to an external pressure in the external space; and a second connecting line for connecting the pressure vessel to the internal space, wherein the valve is actively connected to the pressure vessel in a way that the valve is opened when a pressure in the pressure vessel does not reach a reference pressure, and the valve is closet when the pressure in the pressure vessel exceeds the reference pressure.

2. The protection system of claim 1, wherein the pressure vessel is a control box, said protection system further comprising:

an internal pressure sensor for detecting an internal pressure in the internal space; and a switching unit for regulating the internal pressure in the internal space, said internal pressure sensor being connected to the switching unit.

3. The protection system of claim 1, further comprising a pressurized air supply for the pressure vessel.

4. The protection system of claim 1, wherein the reference pressure is equal to the external pressure.

5. The protection system of claim 1, further comprising a control pressure line for connecting the pressure vessel to the valve, said valve being configured such that a pressure in the pressure vessel serves as a control pressure, said valve being opened when the control pressure is less than the external pressure, and said valve being closed when the control pressure is greater than the external pressure.

6. The protection system of claim 1, wherein the valve is embodied as a pneumatically controllable valve.

7. The protection system of claim 1, wherein the filter is constructed to be impermeable to flammable dust.

8. The protection system of claim 1, further comprising a retaining element permitting a volume flow through the first connecting line from the external space to the internal space and preventing a volume flow from the internal space to the external space through the first connecting line.

9. The protection system of claim 1, wherein the filter is arranged upstream of the valve with respect to the second gaseous medium that enters the internal space from the external space.

10. An electrical machine, comprising:

a housing configured to delimit an internal space from an external space which surrounds the electrical machine; and a protection system comprising a first connecting line for connecting an internal space of the electric machine to an external space surrounding the electrical machine, a valve movable between a closed position in which the first connecting line is impassable, and an open position in which a flow of a first gaseous medium is permitted through the first connecting line so as to enter the internal space from the external space, a filter impermeable to dust, said filter configured to filter the first gaseous medium that enters the internal space from the external space through the first connecting line and to enable a pressure equalization in the event of a malfunction which causes a drop in pressure in the internal space, a pressure vessel for stockpiling a second gaseous medium, said pressure vessel being configured to subject the internal space to an overpressure compared to an external pressure in the external space, and a second connecting line for connecting the pressure vessel to the internal space, wherein the valve is actively connecting to the pressure vessel in a way that the valve is opened when a pressure in the pressure vessel does not reach a reference pressure and the valve is closed when the pressure in the pressure vessel exceeds the reference pressure.

11. The electric machine of claim 10, wherein the pressure vessel is a control box, said protection system further comprising an internal pressure sensor for detecting an internal pressure in the internal space, and a switching unit for regulating the internal pressure in the internal space, said internal pressure sensor being connected to the switching unit.

12. The electric machine of claim 10, wherein the protection system further comprises a pressurized air supply for the pressure vessel.

13. The electric machine of claim 10, wherein the reference pressure is equal to the external pressure.

14. The electric machine of claim 10, wherein the protection system further comprises a control pressure line for connecting the pressure vessel to the valve, said valve being configured such that a pressure in the pressure vessel serves as a control pressure, said valve being opened when the control pressure is less than the external pressure, and said valve being closed when the control pressure is greater than the external pressure.

15. The electric machine of claim 10, wherein the valve is embodied as a pneumatically controllable valve.

16. The electric machine of claim 10, wherein the filter is constructed to be impermeable to flammable dust.

17. The electric machine of claim 10, wherein the protection system further comprises a retaining element permitting a volume flow through the first connecting line from the external space to the internal space and preventing a volume flow from the internal space to the external space through the first connecting line.

18. The electric machine of claim 10, wherein the filter is arranged upstream of the valve with respect to the second gaseous medium that enters the internal space from the external space.

19. The electrical machine of claim 10, constructed for operation with a high voltage and with an electrical power of at least 1MW and/or in an explosion-protected manner.

20. The electrical machine of claim 10, constructed for operation with a high voltage and with an electrical power of at least 5 MW and/or in an explosion-protected manner.

* * * * *